Sept. 29, 1936.                R. B. PEALER                 2,055,909
                            PIPE CUTTING MACHINE
                  Original Filed Dec. 26, 1935    3 Sheets-Sheet 1

INVENTOR.
Robert B. Pealer,
BY Bates, Golrick & Fear
                    ATTORNEYS Sept. 29, 1936.  R. B. PEALER  2,055,909

PIPE CUTTING MACHINE

Original Filed Dec. 26, 1935  3 Sheets-Sheet 2

INVENTOR.
Robert B. Pealer,
BY Bates, Goldrick & Feary
ATTORNEYS.

Sept. 29, 1936.  R. B. PEALER  2,055,909
PIPE CUTTING MACHINE
Original Filed Dec. 26, 1935  3 Sheets-Sheet 3

INVENTOR.
Robert B. Pealer
BY Bates, Goldrick & Teare
ATTORNEYS.

Patented Sept. 29, 1936

2,055,909

UNITED STATES PATENT OFFICE 2,055,909

PIPE CUTTING MACHINE

Robert B. Pealer, Warren, Ohio, assignor to Beaver Pipe Tools, Inc., Warren, Ohio, a corporation of Ohio Original application December 26, 1935, Serial No. 56,145. Divided and this application April 29, 1936, Serial No. 77,010

10 Claims. (Cl. 164—60)

This invention is a division and a continuation in part of my copending application filed December 26th, 1935, Serial No. 56,145, and assigned to my assignee, the Beaver Pipe Tools, Inc. It is also in the nature of an improvement on the invention which is shown, described and claimed in my prior Patent, 1,947,874, issued February 20th, 1934, to my assignee, The Borden Company, now named Beaver Pipe Tools, Inc.

This invention is concerned with a power machine for performing operations on pipes, and more particularly to a machine adapted to sever a length of pipe into two pieces.

An object of this invention has been to provide a simple and direct self-centering, self-contained cutting unit, having a rolling knife opposed by bearing rollers, which is cheaper and adapted for a greater range of pipe sizes than the knife-cutters.

In general, my machine comprises a slidable carriage adapted to be positioned at different points along the length of a pipe secured in a rotatable chuck, and a pipe cut-off tool carried on the carriage, which cut-off tool is slidably mounted in transverse guides and comprises a member carrying a pair of bearing rollers and a second member carrying a cutter. Means are provided to move the bearing rollers and the cutter toward each other to cut off the pipe positioned therebetween, or to move them apart. It will be seen that this construction is self-centering and does not require any accurate positioning of the cutter before the same is used. It is also self-contained, enabling its removal as a unit whenever desired.

This invention also permits the ready cutting of pipes which are slightly bent, so that their surface adjacent the cutter has a somewhat orbital movement contrasted to the directly axial rotation present when the pipe is straight.

Other objects of this invention will become apparent from the specification following, and from the drawings which are appended hereto as part of said specification. The novel features will be summarized in the claims.

Figure 1:
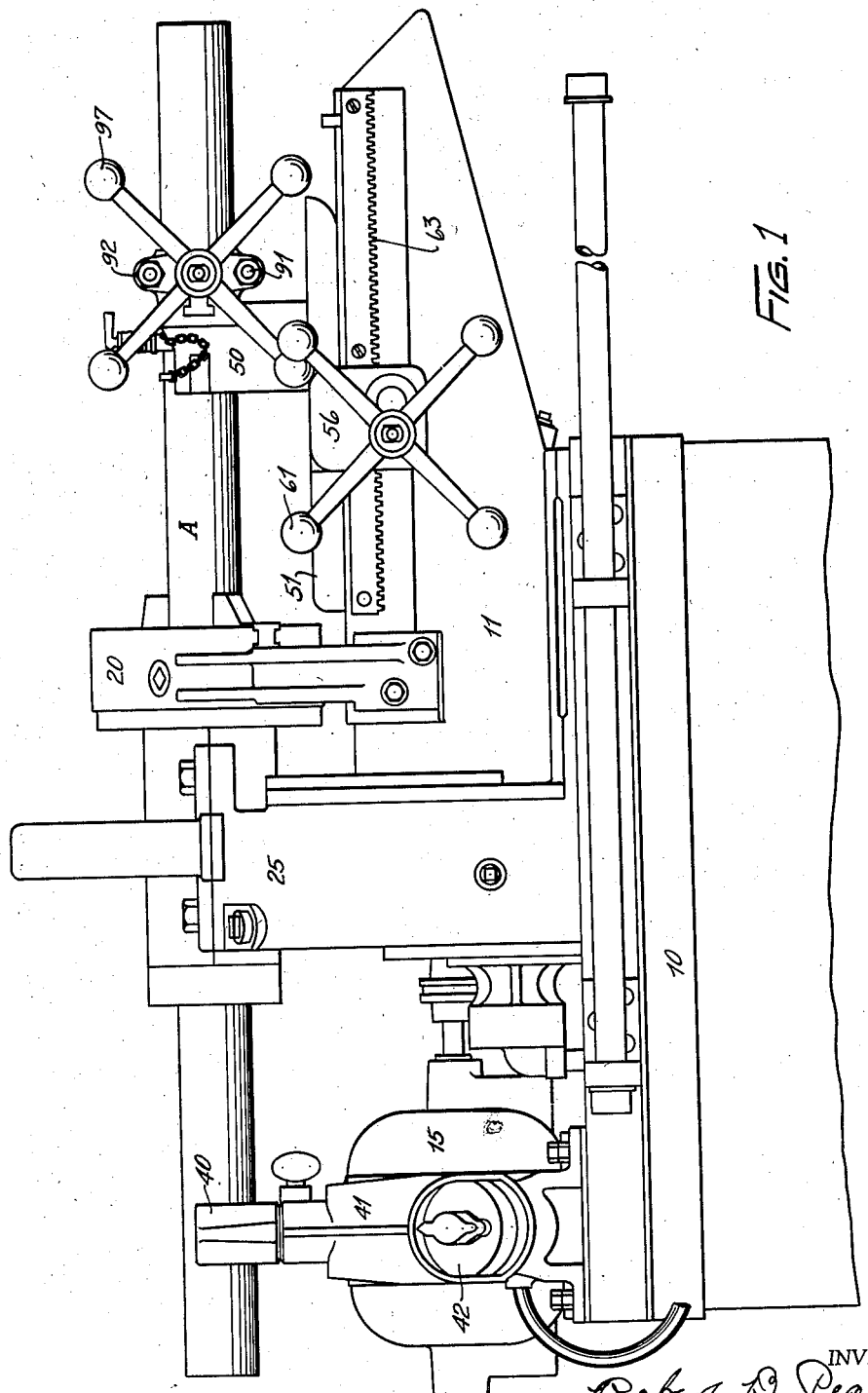
Figure 2:
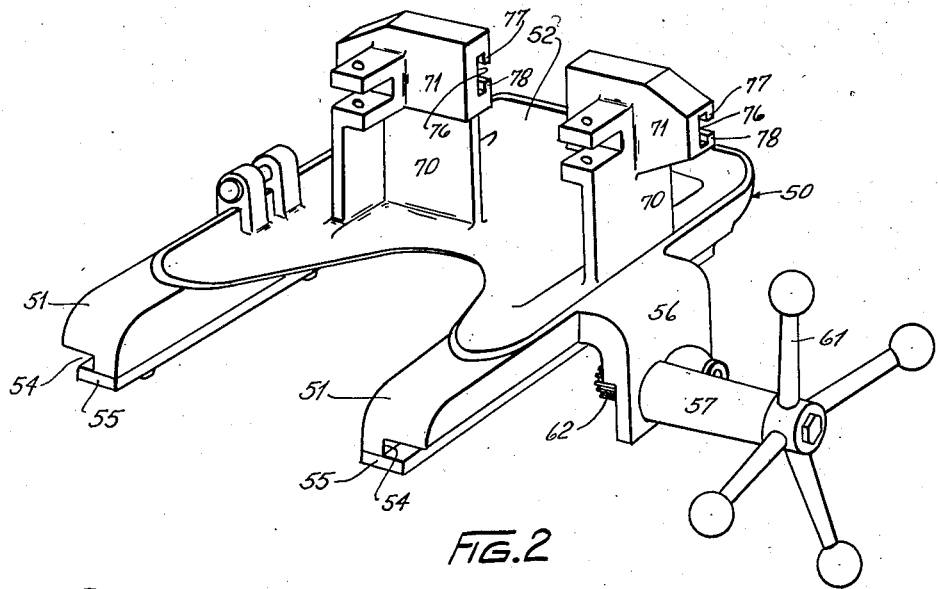
Figure 4:
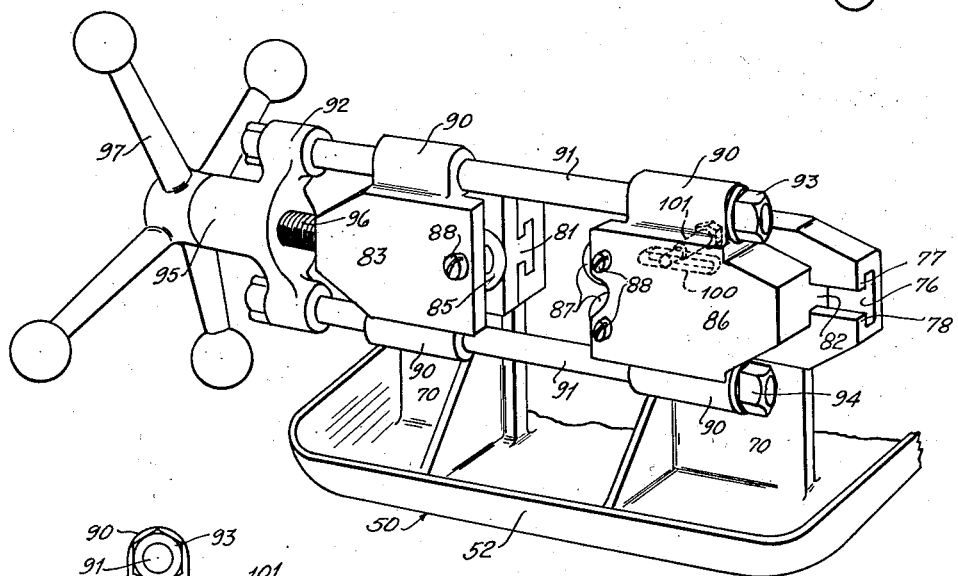
Figure 5:
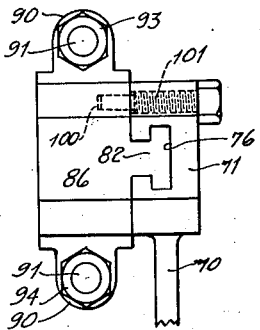
Figure 3:
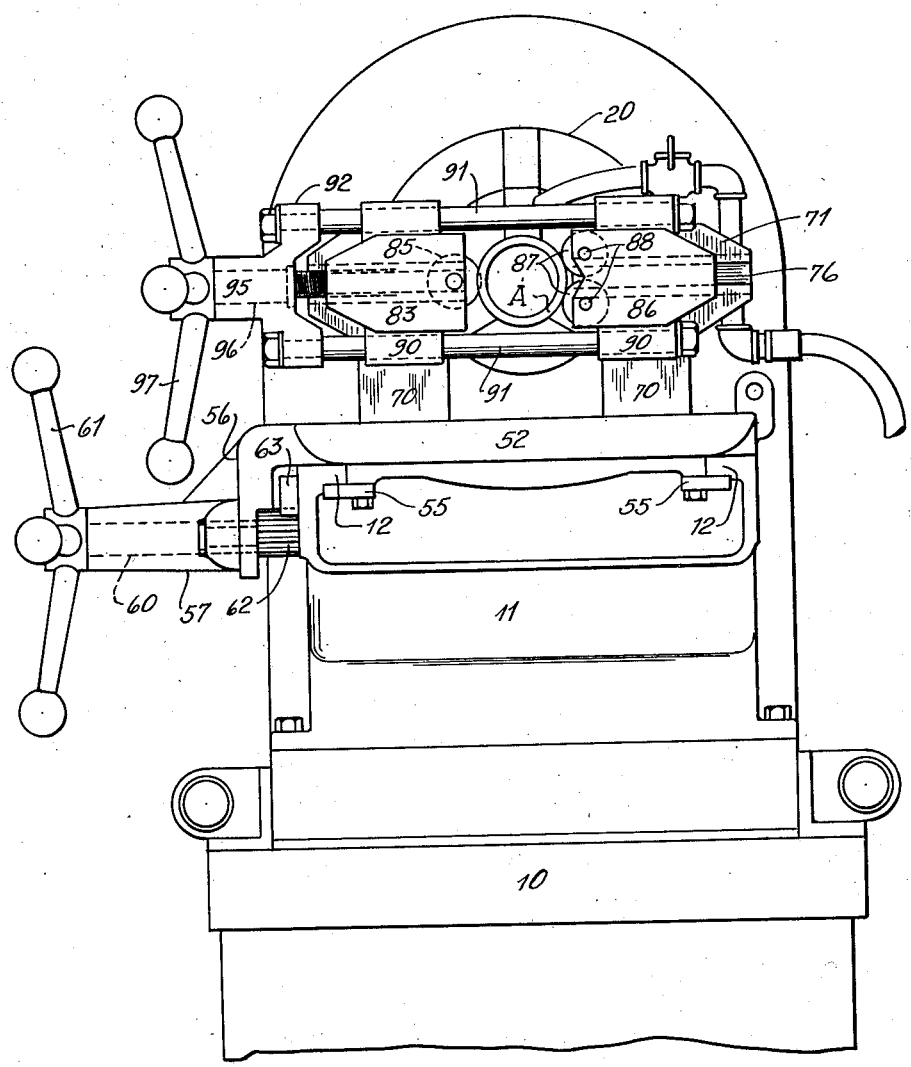

In the drawings, Fig. 1 is a side elevation of my complete pipe-working tool; Fig. 2 is a perspective of the slidable carriage adapted to support the pipe-cutting unit; Fig. 3 is an end elevation of my pipe-cutting machine showing the cutter in position adjacent the pipe; Fig. 4 is a perspective showing the pipe-cutting mechanism in place on the sliding carriage; Fig. 5 is an end view of the pipe-cutting mechanism, as shown from the right in Fig. 3 and showing the means employed to lock the cutter in place on the sliding carriage.

Briefly, the entire machine shown in Figs. 1 and 3 may comprise a frame 10 carrying an overhanging bed 11; a driving motor 15 supported on the bed 10; a rotating chuck 20 mounted in a hollow standard 25 which houses reduction gearing connecting the motor to the chuck, and a carriage 50 slidably mounted on the extension bed 11 and carrying the pipe-working tools.

The chuck 20 is of any suitable form adapted to clamp a pipe, illustrated at A in Figs. 1 and 3. The pipe is shown also as resting behind the chuck on a pipe rest 40 mounted on a standard 41 of inverted U-shape, which is secured to the bed and extends over the motor and carries the motor-controlling switch 42. This pipe rest construction, however, will not be claimed herein, but in another application of mine to which reference will be made.

The extension frame 11 is an open trough-like member having a pair of inwardly projecting ledges 12 at the top of its side walls shown in Fig. 3. The carriage, shown in perspective in Fig. 2, is a casting approximately in the form of a horizontal U, thus providing two straight base portions 51 connected by a yoke portion 52. The base portions rest on the top of the extension frame 11 and are longitudinally rabbeted so that they extend down and along the inner faces of the ledges 12, as shown at 54. To the bottom of the portions 54 I bolt longitudinal strips 55, which underhang the ledges 12, thus slidably attaching the carriage to the extension bed, while enabling its removal if desired.

Extending forwardly and downwardly from the carriage frame is a bracket 56, which may be an integral part of the casting and which carries a forwardly extending tubular boss 57. Mounted in this boss is a shaft 60 to the outer end of which is secured a suitable hand-wheel 61; on the inner end of the shaft is a spur pinion 62 meshing with a downwardly facing stationary rack 63 formed on the front wall of the extension bed 11. This construction enables the carriage to be moved toward and from the chuck as desired.

The carriage 50 includes two upstanding posts 70 having horizontally extending heads 71. These heads have on their faces toward the chuck suitable means for carrying the threading unit, as described in my prior application, Serial No. 56,145.

The two post heads 71, on the opposite side from the chaser carrying ways, have horizontal ways in which the cutter frame is mounted; that is to say, on the head 71 at the top of each post 70 is a horizontal groove 76 restricted at the entrance by rib-like portions 77 and 78.

Describing the cutting unit more specifically, I provide a block 83 carrying the rib 81 and having an internal recess in which is mounted a pipe-cutting wheel 85, and a block 86 carrying the rib 82 and having a recess in which are mounted a pair of pipe bearing rollers 87. The rollers 87 and the wheel 85 are of standard construction for the usual hand pipe cutter, and are mounted in their respective recesses on pins as 88, which pass freely through one portion of the block and are threaded near their free ends to screw into the block at the other side of the recess in the usual manner.

Each of the blocks 83 and 86 is formed on its upper and under-surface with tubular extensions 90. Occupying these extensions are horizontal rods 91, the forward ends of which pass also through a yoke 92. Nuts 93 and 94 are secured to the ends of the rods on the outer side of the yoke and the block 86, respectively. The yoke 92 has a tubular boss 95 in which is rotatably mounted a shaft 96 which has external threads engaging internal threads in the block 83. Mounted on the outer end of the shaft 96 is a hand-wheel 97. The block 83 is slidable on the rods 90, and, accordingly, when the hand wheel 97 is turned the blocks 83 and 86 are caused to approach each other or separate according to the direction of turning of the hand wheel, the blocks being freely slidable in the ways in the heads 71 of the carriage posts 70. This makes the cutting device self-centering, so that irrespective of the size of the pipe, the cutting wheel and thrust rollers will bear against the pipe with equal pressure.

When no pipe is present, the whole cutting unit may be shifted back and forth and may have its opening enlarged or reduced by rotating the hand-wheel; then when the pipe is in place between the knife and bearing rollers, the turning of the hand-wheel to cause the engagement of the knife automatically centers the cutting tool, the rollers coming simultaneously into engagement with the other side of the pipe. As the pipe continues to rotate, the turning of the hand wheel 97 causes the cutter to bear more deeply into the pipe until it is cut off.

To prevent the shiftable cutting unit from being inadvertently disconnected from the carriage when no pipe is between the knife and rollers, I form the block 86 with a recess 100. A screw 101 in the head 71 of the carriage which carries the block 86 occupies the recess 100. This limits the sliding movement of the block 86 between the position suitable for the smallest pipe to be cut and that for the largest pipe, and thereby prevents the cutting unit being inadvertently disconnected from the carriage. However, whenever desired, the removal of the screw 101 holding the block 86 enables the whole cutting unit to be removed.

It will be seen from the above description that I have provided a pipe cut-off tool which is self-centering and has a similar action on the pipe to that of an ordinary hand-cutter, with a wheel knife which has been found to be extremely satisfactory in practice, and have embodied such tool in a very simple self-contained unit which is supported very directly and simply by ways in the carriage standards.

I claim:

1. The combination of a frame, a rotary chuck, a carriage shiftable toward and from the chuck and a pipe-cutting device comprising a cutting wheel and an opposing roller and means for feeding one toward the other, said pipe-cutting device being mounted on the carriage in a guide on which the wheel, roller and said means are shiftable without relative movement transversely of the carriage and removable as a unit from the carriage.

2. The combination of a frame, a rotary chuck carried thereby, a carriage slidable on the frame, said carriage having a pair of upright posts on opposite sides of the chuck axis, transverse heads on said posts respectively, each head having a horizontal guideway, and a pipe-cutting device including separate supporting blocks for a cutting tool and reactance means, which blocks are self centering upon the tool and reactance means engaging the pipe, said device being slidably mounted in and removable as a unit from the guideway.

3. The combination of a frame, a rotary chuck carried thereby, a sliding carriage carried by the frame, a pair of posts mounted on the carriage on opposite sides of the chuck axis, each post having a horizontal guideway, a pair of blocks mounted in respective guideways, a bar carried by one of the blocks and slidably engaging the other and extending beyond it, a head secured to the bar beyond the block which is slidably engaged, and a screw carried by said head and engaging the adjacent block.

4. The combination of a frame, a rotary chuck carried thereby, a sliding carriage carried by the frame, a pair of posts mounted on the carriage on opposite sides of the chuck axis, T-slot guideways in each post, in alignment with each other, a pair of blocks mounted in respective T-slots, a bar carried by one of the blocks slidably engaging the other and extending beyond it, a head secured to the bar beyond the block slidably engaged, and a screw carried by said head and engaging the adjacent block.

5. The combination of a frame, a rotary chuck mounted thereon, means to rotate said chuck, a carriage mounted on the frame and slidable toward and from the chuck, a T-slot cut into said carriage and extending transversely of the frame, a pipe-cutting device comprising separate supporting blocks respectively carrying a cutting wheel and an opposing roller, said blocks being slidably mounted in said T-slot, and means operatively connecting the blocks for feeding the wheel and the roller toward each other.

6. The combination of a carriage, means on the carriage providing horizontal guideways, a pair of blocks mounted in the respective guideways, a bearing roller in one of said blocks, a cutting wheel on the other block, a pair of rods connected to one of the blocks and slidably engaging the other above and below the plane of the cutting wheel and roller, and extending beyond the block which is slidably engaged, said rods being independent of said carriage, a yoke connecting the extension of said rods and means mounted in the yoke and engaging the adjacent block to cause the blocks to approach each other or separate as desired.

7. The combination of a frame, a rotary chuck carried thereby, a sliding carriage on the frame, a cutting device slidable on the carriage without relative movement of its parts, said device comprising a cutting wheel and a bearing roller and means for causing the cutting wheel and roller to approach each other or to separate, as desired, and means for releasably retaining the cutting device as a unit on the carriage and permitting removal of said device without disassembly.

8. The combination of a frame, a rotary chuck carried thereby, a carriage slidably mounted on the frame, upright standards on the carriage in front of and behind the chuck axis, a pair of blocks slidably mounted in horizontal guideways on the standards, a cutting tool and a bearing roller carried by said blocks, respectively, means independent of the guideway connecting the blocks so that they can be shifted as a unit in the guideway, means for causing one block to approach the other or recede therefrom, and means so connecting one of the blocks to one of the standards that the entire cutting device may be removed as a unit from the carriage.

9. The combination of a rotary chuck, a slidable carriage having upright standards on opposite sides of the chuck axis, each standard having a head with a horizontal groove therein, the grooves in the two standards aligning and being in substantially the same plane as the pipe axis, a self-contained pipe cutting unit comprising a block carrying a cutting wheel, a block carrying a bearing roller, a pair of rods secured to one block and extending slidably through bearing sleeves on the other block, said rods being connected by a head beyond the last-mentioned block, and a screw mounted in said head and engaging the adjacent block for causing the heads to approach each other or recede, said blocks having on their back ribs slidably occupying the grooves in the standard heads.

10. The combination of a frame, a rotary chuck carried by said frame, a carriage slidable horizontally on said frame, a pair of upright posts on opposite sides of the chuck axis and rigid with said carriage, a transverse guideway in each post, a block slidably carried in each guideway, one having a pipe working tool and one a reactance guide adapted to engage the pipe opposite the working point, a member secured to one block and slidably engaging the other block above and below the chuck axis, a head on said member beyond the block slidably engaged, a screw-threaded shaft carried by the member and engaging the adjacent block and said member in a manner to move the member and adjacent block toward and away from each other, the screw having its working axis in a plane coincident with the chuck axis.

ROBERT B. PEALER.